(12) United States Patent
Xia et al.

(10) Patent No.: US 10,685,245 B2
(45) Date of Patent: Jun. 16, 2020

(54) METHOD AND APPARATUS OF OBTAINING OBSTACLE INFORMATION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Tian Xia, Beijing (CN); Ji Wan, Beijing (CN); Rui Wang, Beijing (CN); Xun Sun, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 22 days.

(21) Appl. No.: 15/991,405

(22) Filed: May 29, 2018

(65) Prior Publication Data
US 2018/0365503 A1 Dec. 20, 2018

(30) Foreign Application Priority Data
Jun. 16, 2017 (CN) .................. 2017 1 04567683

(51) Int. Cl.
*G08G 1/16* (2006.01)
*G06K 9/00* (2006.01)
(Continued)

(52) U.S. Cl.
CPC ......... *G06K 9/00805* (2013.01); *G06K 9/629* (2013.01); *G06K 9/6256* (2013.01);
(Continued)

(58) Field of Classification Search
CPC .. G06K 9/00805; G06K 9/6256; G06K 9/629; G06K 9/00664; G06K 9/6269; G01S 17/46; G06N 3/02; G06N 3/08; G06N 3/0454; G06T 7/70; G06T 2207/10044; G06T 2207/10028; G06T 7/73; G06T 2207/20081; G06T 2207/20084; G06T 2207/10016; G06T 2207/30261
See application file for complete search history.

(56) References Cited

U.S. PATENT DOCUMENTS

| | | | |
|---|---|---|---|
| 8,077,294 B1 * | 12/2011 | Grund .................. | G01N 21/65 356/4.01 |
| 2013/0216089 A1 * | 8/2013 | Chen .................... | G06T 7/0002 382/100 |

(Continued)

*Primary Examiner* — Howard D Brown, Jr.
(74) *Attorney, Agent, or Firm* — Lando & Anastasi, LLP

(57) ABSTRACT

The present disclosure provides a method and apparatus of obtaining obstacle information, a device and a computer storage medium, wherein the method of obtaining obstacle information comprises: obtaining scenario data synchronously collected by a laser radar device and a camera device; using point cloud top view data in the scenario data to perform obstacle recognition to obtain a point cloud set of candidate obstacles; using fusion features of the scenario data corresponding to the point cloud set of the candidate obstacles to perform obstacle recognition to obtain specific obstacle information. The technical solution according to the present disclosure enables accurate obtainment of specific obstacle information, thereby enhances the sensing capability of the self-driving vehicle and improves safety of the self-driving vehicle.

24 Claims, 3 Drawing Sheets

(51) Int. Cl.
*G06T 7/70* (2017.01)
*G06K 9/62* (2006.01)
*G06N 3/02* (2006.01)
*G06N 3/08* (2006.01)

(52) U.S. Cl.
CPC ............ *G06K 9/6262* (2013.01); *G06N 3/02* (2013.01); *G06N 3/08* (2013.01); *G06T 7/70* (2017.01); *G06T 2207/10028* (2013.01); *G06T 2207/10044* (2013.01)

(56) References Cited

U.S. PATENT DOCUMENTS

| | | | | |
|---|---|---|---|---|
| 2013/0332061 | A1* | 12/2013 | Dowdall | B60R 21/00 701/301 |
| 2014/0214255 | A1* | 7/2014 | Dolgov | G05D 1/0248 701/23 |
| 2019/0026920 | A1* | 1/2019 | Yi | G06T 7/579 |

* cited by examiner

METHOD AND APPARATUS OF OBTAINING OBSTACLE INFORMATION, DEVICE AND COMPUTER STORAGE MEDIUM

The present application claims the priority of Chinese Patent Application No. 2017104567683, filed on Jun. 16, 2017, with the title of "Method and apparatus of obtaining obstacle information, device and computer storage medium. The disclosure of the above applications is incorporated herein by reference in its entirety.

FIELD OF THE DISCLOSURE

The present disclosure relates to the technical field of self-driving, and particularly to a method and apparatus of obtaining obstacle information, a device and a computer storage medium.

BACKGROUND OF THE DISCLOSURE

In self-driving technology, an environment-sensing technique of a self-driving vehicle is very important. At present, the sensing of the driving environment of the self-driving vehicle mainly depends on a manner of using a laser radar as a sensor to perform obstacle detection. However, the manner of using a laser radar as a sensor to perform obstacle detection has certain limitations: there are fewer points shed by the laser radar on some small obstacles (such as pedestrians or bicycle riders), so the point cloud data of the obstacle obtained by the laser radar are sparse, and it is very difficult to judge specific obstacle information upon recognition through a recognition algorithm. Loss or inaccuracy of the obstacle information affects the driving policy of the self-driving vehicle and thereby affects the driving safety of the self-driving vehicle. Therefore, it is desirable to provide a method capable of accurately obtaining the specific obstacle information.

SUMMARY OF THE DISCLOSURE

In view of the above, the present disclosure provides a method and apparatus of obtaining obstacle information, a device and a computer storage medium, to accurately obtain specific obstacle information, thereby increasing the sensing capability of the self-driving vehicle and improving safety of the self-driving vehicle.

A technical solution employed by the present invention to solve the technical problem is to provide a method of obtaining obstacle information, the method comprising: obtaining scenario data synchronously collected by a laser radar device and a camera device; using point cloud top view data in the scenario data to perform obstacle recognition to obtain a point cloud set of candidate obstacles; using fusion features of the scenario data corresponding to the point cloud set of the candidate obstacles to perform obstacle recognition to obtain specific obstacle information.

According to a preferred embodiment of the present disclosure, the scenario data comprise point cloud data and image data, wherein the point cloud data includes point cloud top view data.

According to a preferred embodiment of the present disclosure, the laser radar device and the camera device synchronously collecting the scenario data comprises: the laser radar device and the camera device performing scenario data collection at a preset frequency.

According to a preferred embodiment of the present disclosure, the using point cloud top view data in the scenario data to perform obstacle recognition to obtain a point cloud set of candidate obstacles comprises: inputting the point cloud top view data in the scenario data into a candidate obstacle generating network to perform obstacle recognition; obtaining the point cloud set of the candidate obstacles according to an output result of the candidate obstacle generating network.

According to a preferred embodiment of the present disclosure, the candidate obstacle generating network is obtained by pre-training in the following manner: obtaining an obstacle point cloud set and point cloud top view data corresponding to each obstacle point cloud set; considering the point cloud top view data and obstacle point cloud set as a training sample to train a neural network to obtain the candidate obstacle generating network.

According to a preferred embodiment of the present disclosure, the using fusion features of the scenario data corresponding to the point cloud set of the candidate obstacles comprises: obtaining a location of each candidate obstacle in the point cloud set of the candidate obstacles; obtaining the scenario data corresponding to each candidate obstacle according to the location of said each candidate obstacle; extracting features of the point cloud data and the image data in the scenario data, and fusing the extracted features into fusion features of the scenario data corresponding to the point cloud set of the candidate obstacles; using the fusion features of the scenario data corresponding to the point cloud set of the candidate obstacles to perform obstacle recognition.

According to a preferred embodiment of the present disclosure, using fusion features of the scenario data corresponding to the point cloud set of the candidate obstacles to perform obstacle recognition to obtain specific obstacle information comprises: inputting the fusion features of the scenario data corresponding to the point cloud set of the candidate obstacles into a candidate obstacle tuning network for obstacle recognition; obtaining the specific obstacle information according to an output result of the candidate obstacle tuning network.

According to a preferred embodiment of the present disclosure, the candidate obstacle tuning network is obtained by pre-training in the following manner: obtaining the specific obstacle information and the fusion features corresponding to each obstacle point cloud set; considering the fusion features of the obstacle point cloud set and the specific obstacle information as a training sample to train a neural network to obtain the candidate obstacle tuning network.

According to a preferred embodiment of the present disclosure, the specific obstacle information comprises: at least one of presence or absence of the obstacle, a class of the obstacle, a location of the obstacle and dimensions of the obstacle.

A technical solution employed by the present disclosure to solve the technical problem provides an apparatus of obtaining obstacle information, the apparatus comprising: an obtaining unit configured to obtain scenario data synchronously collected by a laser radar device and a camera device; a first recognizing unit configured to use point cloud top view data in the scenario data to perform obstacle recognition to obtain a point cloud set of candidate obstacles; a second recognizing unit configured to use fusion features of the scenario data corresponding to the point cloud set of the candidate obstacles to perform obstacle recognition to obtain specific obstacle information.

According to a preferred embodiment of the present disclosure, the scenario data obtained by the obtaining unit comprise point cloud data and image data, wherein the point cloud data includes point cloud top view data.

According to a preferred embodiment of the present disclosure, the laser radar device and the camera device synchronously collecting the scenario data comprises: the laser radar device and the camera device performing scenario data collection at a preset frequency.

According to a preferred embodiment of the present disclosure, upon using point cloud top view data in the scenario data to perform obstacle recognition to obtain a point cloud set of candidate obstacles, the first recognizing unit specifically executes: inputting the point cloud top view data in the scenario data into a candidate obstacle generating network to perform obstacle recognition; obtaining the point cloud set of the candidate obstacles according to an output result of the candidate obstacle generating network.

According to a preferred embodiment of the present disclosure, the candidate obstacle generating network used by the first recognizing unit is obtained by pre-training in the following manner: obtaining an obstacle point cloud set and point cloud top view data corresponding to each obstacle point cloud set; considering the point cloud top view data and the obstacle point cloud set as a training sample to train a neural network to obtain the candidate obstacle generating network.

According to a preferred embodiment of the present disclosure, upon using fusion features of the scenario data corresponding to the point cloud set of the candidate obstacles to perform obstacle recognition, the second recognizing unit specifically executes: obtaining a location of each candidate obstacle in the point cloud set of the candidate obstacles; obtaining the scenario data corresponding to each candidate obstacle according to the location of said each candidate obstacle; extracting features of the point cloud data and the image data in the scenario data, fusing the extracted features into fusion features of the scenario data corresponding to the point cloud set of the candidate obstacles; using the fusion features of the scenario data corresponding to the point cloud set of the candidate obstacles to perform obstacle recognition.

According to a preferred embodiment of the present disclosure, upon using fusion features of the scenario data corresponding to the point cloud set of the candidate obstacles to perform obstacle recognition to obtain specific obstacle information, the second recognizing unit specifically executes: inputting the fusion features of the scenario data corresponding to the point cloud set of the candidate obstacles into a candidate obstacle tuning network for obstacle recognition; obtaining the specific obstacle information according to an output result of the candidate obstacle tuning network.

According to a preferred embodiment of the present disclosure, the candidate obstacle tuning network used by the second recognizing unit is obtained by pre-training in the following manner: obtaining the specific obstacle information and the fusion features corresponding to each obstacle point cloud set; considering the fusion features of the obstacle point cloud set and the specific obstacle information as a training sample to train a neural network to obtain the candidate obstacle tuning network.

According to a preferred embodiment of the present disclosure, the specific obstacle information obtained by the second recognizing unit comprises: at least one of presence or absence of the obstacle, a class of the obstacle, a location of the obstacle and dimensions of the obstacle.

As can be seen from the above technical solutions, by using the laser radar device in conjunction with a camera device to obtain the scenario data, and allowing the image data obtained by the camera device to remedy the drawback of sparse point cloud data obtained by the laser radar device, the present disclosure achieves accurate obtainment of specific obstacle information, thereby improving the sensing capability of the self-driving vehicle and improving safety of the self-driving vehicle.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

In the prior art, when obstacle detection is performed by only using the laser radar, there is a problem of loss or inaccuracy of the obtained obstacle information, and loss or inaccuracy of the obstacle information might affect the driving safety of the self-driving vehicle. Therefore, by using a laser radar device in conjunction with a camera device to obtain scenario data, and allowing image data obtained by the camera device to remedy the drawback of sparse point cloud data obtained by the laser radar device, the present disclosure achieves accurate obtainment of specific obstacle information, thereby improving the sensing capability of the self-driving vehicle and improving safety of the self-driving vehicle.

Figure 1:
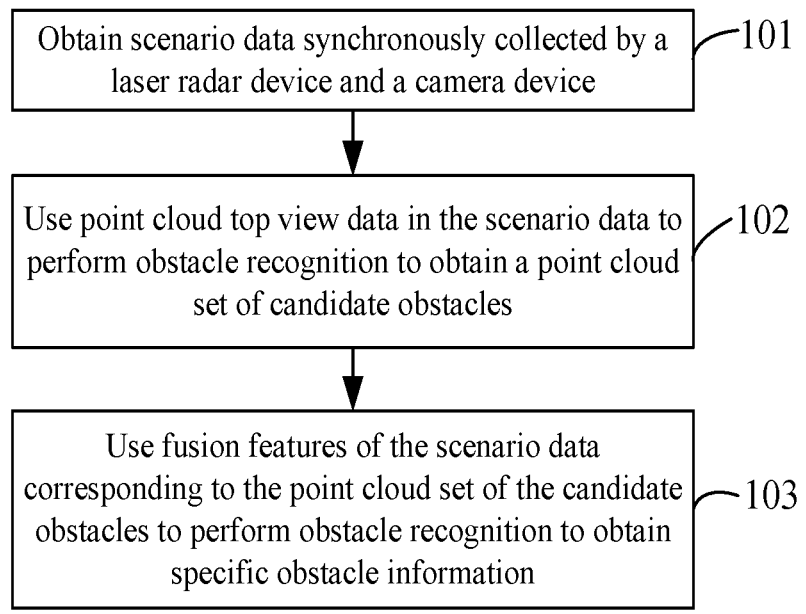
FIG. 1 is a flow chart of a method of obtaining obstacle information according to an embodiment of the present disclosure.

FIG. 1 is a flow chart of a method of obtaining obstacle information according to an embodiment of the present disclosure. As shown in FIG. 1, the method comprises:

In 101 are obtained scenario data synchronously collected by a laser radar device and a camera device.

In this step, the obtained scenario data collected by the laser radar device and the camera device is environment data around the self-driving vehicle. Specifically, the scenario data collected by the laser radar device and the camera device include point cloud data and image data, wherein the point cloud data is collected by the laser radar device and includes point cloud top view data or further includes point cloud front view data; the image data are images collected by the camera device.

Upon collecting the scenario data of the self-driving vehicle, the laser radar device and the camera device must collect synchronously to ensure that the collected point cloud data and image data can correspond to each other. Upon collecting the scenario data, the laser radar device and the camera device need to perform synchronous collection at a preset frequency. Optionally, in a specific implementation procedure of the present embodiment, it is feasible to collect the scenario data in a manner that the laser radar device triggers the camera device at a preset collection frequency. It is also feasible that the laser radar device and the camera device perform scenario data collection simultaneously at a preset collection frequency.

For example, if the preset collection frequency of the laser radar device is 10 Hz, the laser radar device is used to collect a signal with a 10 Hz frequency as a trigger signal to trigger a shutter of the camera device, thereby enabling the two to have the same collection frequency and achieving synchronous scenario data collection of the laser radar device and the camera device. For another example, the laser radar device and the camera device simultaneously collect at a preset collection frequency. If the preset collection frequency of the two devices is 20 Hz, the laser radar device and the camera device simultaneously perform scenario data collection at the 20 Hz collection frequency.

In the present disclosure, the types of the laser radar device and the camera device are not limited. For example, the laser radar device may be a 64-wire harness laser radar or 16-wire harness laser radar; the camera device may be a monocular camera or other devices capable of capturing images, such as a smart mobile phone or a video camera.

In 102, point cloud top view data in the scenario data are used to perform obstacle recognition to obtain a point cloud set of candidate obstacles.

In this step, point cloud top view data in the scenario data collected in step 101 are used to perform obstacle recognition, thereby obtaining a point cloud set of candidate obstacles corresponding to the collected scenario data. The obtained point cloud set of candidate obstacles includes a point cloud set of all candidate obstacles determined according to the obtained scenario data. That is to say, through this step, all possible candidate obstacles corresponding to the scenario data are recognized preliminarily according to the obtained scenario data.

In this step, the point cloud top view data are input into a candidate obstacle generating network, and the point cloud set of the candidate obstacles corresponding to the obtained scenario data is obtained according to an output result of the candidate obstacle generating network. The candidate obstacle generating network is obtained by pre-training according to the training data. After the candidate obstacle generating network is obtained by training, the point cloud set of the candidate obstacles corresponding to the obtained scenario data is obtained according to the point cloud top view data in the scenario data.

Specifically, the candidate obstacle generating network may be obtained by pre-training in the following manner: obtaining an obstacle point cloud set and point cloud top view data corresponding to each obstacle point cloud set; considering the obtained point cloud top view data and obstacle point cloud set as a training sample to train to obtain the candidate obstacle generating network. The candidate obstacle generating network may be a neural network such as a Deep Neural Network (DNN), a Convolutional Neural Network (CNN) or a Recurrent Neural Network (RNN); the candidate obstacle generating network may be a classification model such as a Support Vector Machine (SVM). The present disclosure does not limit the type of the candidate obstacle generating network.

In 103, fusion features of the scenario data corresponding to the point cloud set of the candidate obstacles are used to perform obstacle recognition to obtain specific obstacle information.

In this step, the point cloud set of candidate obstacles obtained in step 102 and the scenario data collected in step 101 are used to perform obstacle recognition to obtain specific obstacle information.

Since the point cloud data collected by the laser radar device might be sparse, it might be impossible to determine whether an obstacle is really present or to obtain class information of the obstacle only through use of the point cloud. Information contained in the image data collected by the camera device is dense, and texture and color information is richer. Therefore, in this step, performing obstacle recognition after fusing the point cloud data and the image data can overcome the drawback about failure to determine whether an obstacle is really present and to obtain class information of the obstacle because the point cloud data is sparse.

First, the scenario data corresponding to candidate obstacles in the point cloud set of the candidate obstacles obtained in step 102 are fused. Specifically, features of the point cloud data and the image data corresponding to the candidate obstacles in the point cloud set of the candidate obstacles are extracted, the extracted features are fused and then considered as fusion feature of the scenario data corresponding to the point cloud set of the candidate obstacles. Locations of candidate obstacles in the point cloud set of the candidate obstacles can be acquired through the point cloud data obtained by the laser radar device, and the collected point cloud data correspond to the image data. Therefore, after the locations of candidate obstacles are obtained through the point cloud data, image data corresponding to the candidate obstacles at the locations can be obtained from the image data.

Then, the fusion features of the scenario data corresponding to the point cloud set of candidate obstacles are used to perform obstacle recognition to obtain specific obstacle information. The obtained specific obstacle information comprises: at least one of presence or absence of the obstacle, a class of the obstacle, a location of the obstacle and dimensions of the obstacle.

In this step, the fusion features of the scenario data corresponding to the point cloud set of the candidate obstacles are input into a candidate obstacle tuning network, and the specific obstacle information is obtained according to an output result of the candidate obstacle tuning network, wherein the candidate obstacle tuning network is obtained by pre-training according training data.

Specifically, the candidate obstacle tuning network may be obtained by pre-training in the following manner: obtaining the specific obstacle information and the fusion features corresponding to the point cloud set of obstacles, wherein the specific obstacle information comprises: at least one of a class of the obstacle, a location of the obstacle and dimensions of the obstacle; considering the fusion features of the obtained point cloud set of obstacles and the specific obstacle information as a training sample to train to obtain the candidate obstacle tuning network. After the candidate obstacle tuning network is obtained, it is possible to obtain the specific obstacle information according to the fusion features of the scenario data corresponding to the obtained point cloud set of candidate obstacles.

The candidate obstacle tuning network may be a neural network such as a Deep Neural Network (DNN), a Convolutional Neural Network (CNN) or a Recurrent Neural Network (RNN); the candidate obstacle tuning network may be a classification model such as a Support Vector Machine (SVM). The present disclosure does not limit the type of the candidate obstacle tuning network.

Figure 2:
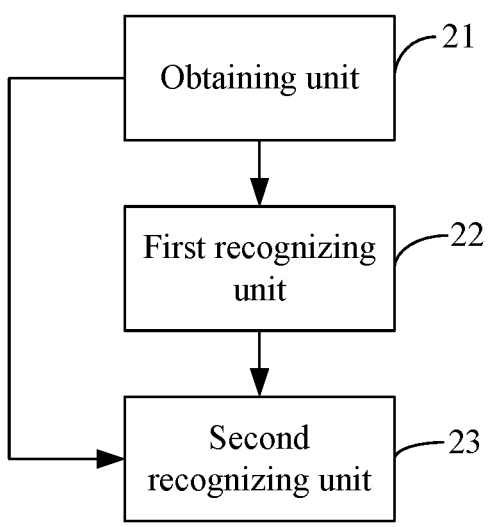
FIG. 2 is a structural diagram of an apparatus of obtaining obstacle information according to an embodiment of the present disclosure.

FIG. 2 is a structural diagram of an apparatus of obtaining obstacle information according to an embodiment of the present disclosure. As shown in FIG. 2, the apparatus comprises: an obtaining unit 21, a first recognizing unit 22, and a second recognizing unit 23.

The obtaining unit 21 is configured to obtain scenario data synchronously collected by a laser radar device and a camera device.

The scenario data collected by the laser radar device and the camera device and obtained by the obtaining unit 21 is environment data around the self-driving vehicle. Specifically, the scenario data collected by the laser radar device and the camera device include point cloud data and image data, wherein the point cloud data is collected by the laser radar device and includes point cloud top view data or further includes point cloud front view data; the image data are images collected by the camera device.

Upon collecting the scenario data of the self-driving vehicle, the laser radar device and the camera device must collect synchronously to ensure that the collected point cloud data and image data can correspond to each other. Upon collecting the scenario data, the laser radar device and the camera device need to perform synchronous collection at a preset frequency. Optionally, in a specific implementation procedure of the present embodiment, it is feasible to collect the scenario data in a manner that the laser radar device triggers the camera device at a preset collection frequency. It is also feasible that the laser radar device and the camera device perform scenario data collection simultaneously at a preset collection frequency.

For example, if the preset collection frequency of the laser radar device is 10 Hz, the laser radar device is used to collect a signal with a 10 Hz frequency as a trigger signal to trigger a shutter of the camera device, thereby enabling the two to have the same collection frequency and achieving synchronous scenario data collection of the laser radar device and the camera device. For another example, the laser radar device and the camera device simultaneously collect at a preset collection frequency. If the preset collection frequency of the two devices is 20 Hz, the laser radar device and the camera device simultaneously perform scenario data collection at the 20 Hz collection frequency.

In the present disclosure, the types of the laser radar device and the camera device are not limited. For example, the laser radar device may be a 64-wire harness laser radar or 16-wire harness laser radar; the camera device may be a monocular camera or other devices capable of capturing images, such as a smart mobile phone or a video camera.

The first recognizing unit 22 is configured to use point cloud top view data in the scenario data to perform obstacle recognition to obtain a point cloud set of candidate obstacles.

The first recognizing unit 22 uses point cloud top view data in the scenario data collected by the obtaining unit 21 to perform obstacle recognition, thereby obtaining the point cloud set of candidate obstacles corresponding to the collected scenario data. The point cloud set of candidate obstacles obtained by the first recognizing unit 22 includes a point cloud set of all candidate obstacles determined according to the obtained scenario data. That is to say, through the first recognizing unit 22, all possible candidate obstacles corresponding to the scenario data are recognized preliminarily according to the obtained scenario data.

The first recognizing unit 22 inputs the point cloud top view data into a candidate obstacle generating network, and obtains the point cloud set of the candidate obstacles corresponding to the obtained scenario data according to an output result of the candidate obstacle generating network. The candidate obstacle generating network is obtained by pre-training according to the training data. After the candidate obstacle generating network is obtained by training, the first recognizing unit 22 obtains the point cloud set of the candidate obstacles corresponding to the obtained scenario data according to the point cloud top view data in the scenario data.

Specifically, the candidate obstacle generating network may be obtained by pre-training in the following manner: obtaining an obstacle point cloud set and point cloud top view data corresponding to each obstacle point cloud set; considering the obtained point cloud top view data and obstacle point cloud set as a training sample to train to obtain the candidate obstacle generating network. The candidate obstacle generating network may be a neural network such as a Deep Neural Network (DNN), a Convolutional Neural Network (CNN) or a Recurrent Neural Network (RNN); the candidate obstacle generating network may be a classification model such as a Support Vector Machine (SVM). The present disclosure does not limit the type of the candidate obstacle generating network.

The second recognizing unit 23 is configured to use fusion features of the scenario data corresponding to the point cloud set of the candidate obstacles to perform obstacle recognition to obtain specific obstacle information.

The second recognizing unit 23 uses the point cloud set of candidate obstacles obtained by the first recognizing unit 22 and the scenario data collected by the obtaining unit 21 to perform obstacle recognition to obtain specific obstacle information.

Since the point cloud data collected by the laser radar device might be sparse, it might be impossible to determine whether an obstacle is really present or to obtain class information of the obstacle only through use of the point cloud. Information contained in the image data collected by the camera device is dense, and texture and color information is richer. Therefore, the second recognizing unit 23, by performing obstacle recognition after fusing the point cloud data and the image data, can overcome the drawback about failure to determine whether an obstacle is really present and to obtain class information of the obstacle because the point cloud data is sparse.

First, the second recognizing unit 23 fuses the scenario data corresponding to the point cloud set of the candidate obstacles obtained by the first recognizing unit 22. Specifically, the second recognizing unit 23 extracts features of the point cloud data and the image data corresponding to the candidate obstacles in the point cloud set of the candidate obstacles, the extracted features are fused and then considered as fusion feature of the scenario data corresponding to the point cloud set of the candidate obstacles. The second recognizing unit 23 can acquire locations of candidate obstacles in the point cloud set of the candidate obstacles through the point cloud data obtained by the laser radar device, and the point cloud data correspond to the image data. Therefore, the second recognizing unit 23, after obtaining the locations of candidate obstacles through the point cloud data, can obtain image data corresponding to the candidate obstacles at the locations from the image data.

Then, the second recognizing unit 23 uses the fusion features of the scenario data corresponding to the point cloud set of candidate obstacles to perform obstacle recognition to obtain specific obstacle information. The specific obstacle information obtained by the second recognizing unit 23 comprises: at least one of presence or absence of the obstacle, a class of the obstacle, a location of the obstacle and dimensions of the obstacle.

The second recognizing unit 23 inputs the fusion features of the scenario data corresponding to the point cloud set of the candidate obstacles into a candidate obstacle tuning network, and obtains the specific obstacle information according to an output result of the candidate obstacle tuning network, wherein the candidate obstacle tuning network is obtained by pre-training according training data.

Specifically, the candidate obstacle tuning network may be obtained by pre-training in the following manner: obtaining the specific obstacle information and the fusion features corresponding to the point cloud set of obstacles, wherein the specific obstacle information comprises: at least one of a class of the obstacle, a location of the obstacle and dimensions of the obstacle; considering the fusion features of the obtained point cloud set of obstacles and the specific obstacle information as a training sample to train to obtain the candidate obstacle tuning network. After obtaining the candidate obstacle tuning network, the second recognizing unit 23 obtains the specific obstacle information according to the fusion features of the scenario data corresponding to the obtained point cloud set of candidate obstacles.

The candidate obstacle tuning network may be a neural network such as a Deep Neural Network (DNN), a Convolutional Neural Network (CNN) or a Recurrent Neural Network (RNN); the candidate obstacle tuning network may be a classification model such as a Support Vector Machine (SVM). The present disclosure does not limit the type of the candidate obstacle tuning network.

Figure 3:
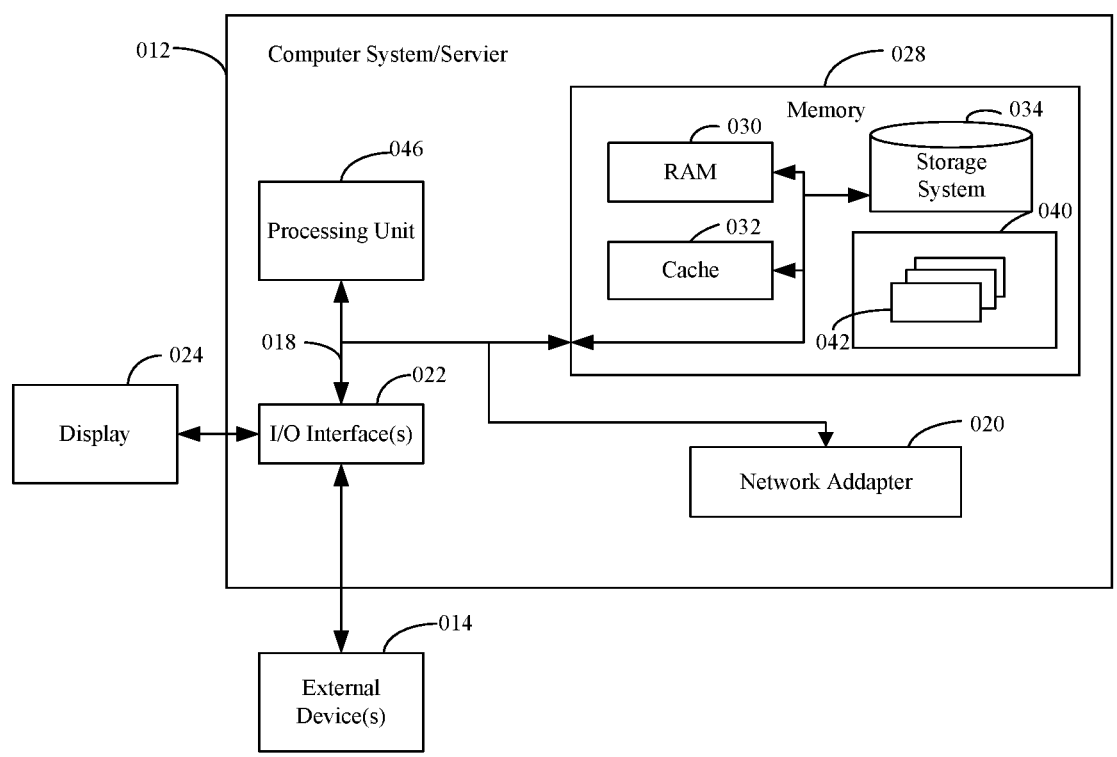
FIG. 3 is a block diagram of a computer system/server according to an embodiment of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement a method of obtaining obstacle information, comprising:

obtaining scenario data synchronously collected by a laser radar device and a camera device;

using point cloud top view data in the scenario data to perform obstacle recognition to obtain a point cloud set of candidate obstacles;

using fusion features of the scenario data corresponding to the point cloud set of the candidate obstacles to perform obstacle recognition to obtain specific obstacle information.

The aforesaid computer program may be arranged in a computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method performed by the one or more processors may comprise:

obtaining scenario data synchronously collected by a laser radar device and a camera device;

using point cloud top view data in the scenario data to perform obstacle recognition to obtain a point cloud set of candidate obstacles;

using fusion features of the scenario data corresponding to the point cloud set of the candidate obstacles to perform obstacle recognition to obtain specific obstacle information.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

By using the laser radar device in conjunction with the camera device to obtain scenario data, and allowing image data obtained by the camera device to remedy the drawback of sparse point cloud data obtained by the laser radar device, the technical solutions provided by the present disclosure achieve accurate obtainment of specific obstacle information, thereby improving the sensing capability of the self-driving vehicle and improving safety of the self-driving vehicle.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of obtaining obstacle information, wherein the method comprises:
  obtaining scenario data synchronously collected by a laser radar device and a camera device, wherein the scenario data comprise point cloud data and image data, wherein the point cloud data includes point cloud top view data;
  using the point cloud top view data in the scenario data to perform obstacle recognition to obtain a point cloud set of candidate obstacles; and
  using fusion features of the scenario data corresponding to the point cloud set of the candidate obstacles to perform obstacle recognition to obtain specific obstacle information wherein fusion features of the scenario data corresponding to the point cloud set of the candidate obstacles are obtained by fusing features of point cloud data and features of image data corresponding to the candidate obstacles.

2. The method according to claim 1, wherein the laser radar device and the camera device synchronously collecting the scenario data comprises:

the laser radar device and the camera device performing scenario data collection at a preset frequency.

3. The method according to claim 1, wherein the using point cloud top view data in the scenario data to perform obstacle recognition to obtain a point cloud set of candidate obstacles comprises:

inputting the point cloud top view data in the scenario data into a candidate obstacle generating network to perform obstacle recognition;

obtaining the point cloud set of the candidate obstacles according to an output result of the candidate obstacle generating network.

4. The method according to claim 3, wherein the candidate obstacle generating network is obtained by pre-training in the following manner:

obtaining an obstacle point cloud set and point cloud top view data corresponding to each obstacle point cloud set;

considering the point cloud top view data and the obstacle point cloud set as a training sample to train a neural network to obtain the candidate obstacle generating network.

5. The method according to claim 1, wherein the using fusion features of the scenario data corresponding to the point cloud set of the candidate obstacles to perform obstacle recognition comprises:

obtaining a location of each candidate obstacle in the point cloud set of the candidate obstacles;

obtaining the scenario data corresponding to each candidate obstacle according to the location of the each candidate obstacle;

extracting features of the point cloud data and the image data in the scenario data, and fusing the extracted features into fusion features of the scenario data corresponding to the point cloud set of the candidate obstacles;

using the fusion features of the scenario data corresponding to the point cloud set of the candidate obstacles to perform obstacle recognition.

6. The method according to claim 1, wherein using fusion features of the scenario data corresponding to the point cloud set of the candidate obstacles to perform obstacle recognition to obtain specific obstacle information comprises:

inputting the fusion features of the scenario data corresponding to the point cloud set of the candidate obstacles into a candidate obstacle tuning network for obstacle recognition;

obtaining the specific obstacle information according to an output result of the candidate obstacle tuning network.

7. The method according to claim 6, wherein the candidate obstacle tuning network is obtained by pre-training in the following manner:

obtaining the specific obstacle information and the fusion features corresponding to each obstacle point cloud set;

considering the fusion features of the obstacle point cloud set and the specific obstacle information as a training sample to train a neural network to obtain the candidate obstacle tuning network.

8. The method according to claim 1, wherein the specific obstacle information comprises: at least one of presence or absence of the obstacle, a class of the obstacle, a location of the obstacle and dimensions of the obstacle.

9. A device comprising:

one or more processors; and one or more non-transitory media for storing one or more programs, said one or more programs are executed by said one or more processors to enable said one or more processors to implement the following operation:

obtaining scenario data synchronously collected by a laser radar device and a camera device, wherein the scenario data comprise point cloud data and image data, wherein the point cloud data includes point cloud top view data;

using the point cloud top view data in the scenario data to perform obstacle recognition to obtain a point cloud set of candidate obstacles; and using fusion features of the scenario data corresponding to the point cloud set of the candidate obstacles to perform obstacle recognition to obtain specific obstacle information wherein fusion features of the scenario data corresponding to the point cloud set of the candidate obstacles are obtained by fusing features of point cloud data and features of image data corresponding to the candidate obstacles.

10. The device according to claim 9, wherein the laser radar device and the camera device synchronously collecting the scenario data comprises:

the laser radar device and the camera device performing scenario data collection at a preset frequency.

11. The device according to claim 9, wherein the using point cloud top view data in the scenario data to perform obstacle recognition to obtain a point cloud set of candidate obstacles comprises:

inputting the point cloud top view data in the scenario data into a candidate obstacle generating network to perform obstacle recognition;

obtaining the point cloud set of the candidate obstacles according to an output result of the candidate obstacle generating network.

12. The device according to claim 11, wherein the candidate obstacle generating network is obtained by pre-training in the following manner:

obtaining an obstacle point cloud set and point cloud top view data corresponding to each obstacle point cloud set;

considering the point cloud top view data and the obstacle point cloud set as a training sample to train a neural network to obtain the candidate obstacle generating network.

13. The device according to claim 9, wherein the using fusion features of the scenario data corresponding to the point cloud set of the candidate obstacles to perform obstacle recognition comprises:

obtaining a location of each candidate obstacle in the point cloud set of the candidate obstacles;

obtaining the scenario data corresponding to each candidate obstacle according to the location of the each candidate obstacle;

extracting features of the point cloud data and the image data in the scenario data, and fusing the extracted features into fusion features of the scenario data corresponding to the point cloud set of the candidate obstacles;

using the fusion features of the scenario data corresponding to the point cloud set of the candidate obstacles to perform obstacle recognition.

14. The device according to claim 9, wherein using fusion features of the scenario data corresponding to the point cloud set of the candidate obstacles to perform obstacle recognition to obtain specific obstacle information comprises:
inputting the fusion features of the scenario data corresponding to the point cloud set of the candidate obstacles into a candidate obstacle tuning network for obstacle recognition;
obtaining the specific obstacle information according to an output result of the candidate obstacle tuning network.

15. The device according to claim 14, wherein the candidate obstacle tuning network is obtained by pre-training in the following manner:
obtaining the specific obstacle information and the fusion features corresponding to each obstacle point cloud set;
considering the fusion features of the obstacle point cloud set and the specific obstacle information as a training sample to train a neural network to obtain the candidate obstacle tuning network.

16. The device according to claim 9, wherein the specific obstacle information comprises: at least one of presence or absence of the obstacle, a class of the obstacle, a location of the obstacle and dimensions of the obstacle.

17. One or more non-transitory computer-readable storage media on which a computer program is stored, wherein the program, when executed by one or more processors, implements the following operations:
obtaining scenario data synchronously collected by a laser radar device and a camera device, wherein the scenario data comprise point cloud data and image data, wherein the point cloud data includes point cloud top view data;
using the point cloud top view data in the scenario data to perform obstacle recognition to obtain a point cloud set of candidate obstacles; and
using fusion features of the scenario data corresponding to the point cloud set of the candidate obstacles to perform obstacle recognition to obtain specific obstacle information wherein fusion features of the scenario data corresponding to the point cloud set of the candidate obstacles are obtained by fusing features of point cloud data and features of image data corresponding to the candidate obstacles.

18. The one or more non-transitory computer-readable storage media according to claim 17, wherein the laser radar device and the camera device synchronously collecting the scenario data comprises:
the laser radar device and the camera device performing scenario data collection at a preset frequency.

19. The one or more non-transitory computer-readable storage media according to claim 17, wherein the using point cloud top view data in the scenario data to perform obstacle recognition to obtain a point cloud set of candidate obstacles comprises:
inputting the point cloud top view data in the scenario data into a candidate obstacle generating network to perform obstacle recognition;
obtaining the point cloud set of the candidate obstacles according to an output result of the candidate obstacle generating network.

20. The one or more non-transitory computer-readable storage media according to claim 19, wherein the candidate obstacle generating network is obtained by pre-training in the following manner:
obtaining an obstacle point cloud set and point cloud top view data corresponding to each obstacle point cloud set;
considering the point cloud top view data and the obstacle point cloud set as a training sample to train a neural network to obtain the candidate obstacle generating network.

21. The one or more non-transitory computer-readable storage media according to claim 17, wherein the using fusion features of the scenario data corresponding to the point cloud set of the candidate obstacles to perform obstacle recognition comprises:
obtaining a location of each candidate obstacle in the point cloud set of the candidate obstacles;
obtaining the scenario data corresponding to each candidate obstacle according to the location of the each candidate obstacle;
extracting features of the point cloud data and the image data in the scenario data, and fusing the extracted features into fusion features of the scenario data corresponding to the point cloud set of the candidate obstacles;
using the fusion features of the scenario data corresponding to the point cloud set of the candidate obstacles to perform obstacle recognition.

22. The one or more non-transitory computer-readable storage media according to claim 17, wherein using fusion features of the scenario data corresponding to the point cloud set of the candidate obstacles to perform obstacle recognition to obtain specific obstacle information comprises:
inputting the fusion features of the scenario data corresponding to the point cloud set of the candidate obstacles into a candidate obstacle tuning network for obstacle recognition;
obtaining the specific obstacle information according to an output result of the candidate obstacle tuning network.

23. The one or more non-transitory computer-readable storage media according to claim 22, wherein the candidate obstacle tuning network is obtained by pre-training in the following manner:
obtaining the specific obstacle information and the fusion features corresponding to each obstacle point cloud set;
considering the fusion features of the obstacle point cloud set and the specific obstacle information as a training sample to train a neural network to obtain the candidate obstacle tuning network.

24. The one or more non-transitory computer-readable storage media according to claim 17, wherein the specific obstacle information comprises: at least one of presence or absence of the obstacle, a class of the obstacle, a location of the obstacle and dimensions of the obstacle.

* * * * *